United States Patent [19]

Kobayashi et al.

[11] Patent Number: 4,784,026
[45] Date of Patent: Nov. 15, 1988

[54] PNEUMATIC SCREW ALIGNER-FEEDER

[75] Inventors: Kenji Kobayashi; Atsuyoshi Fujishima; Mitsuhiro Takatsuru; Jun Maemori; Chikamitsu Sawada, all of Tokyo, Japan

[73] Assignee: Max Co., Ltd., Tokyo, Japan

[21] Appl. No.: 804,450

[22] Filed: Dec. 4, 1985

[30] Foreign Application Priority Data

| Dec. 4, 1984 | [JP] | Japan | 59-184799[U] |
| Dec. 4, 1984 | [JP] | Japan | 59-184797[U] |
| Dec. 4, 1984 | [JP] | Japan | 59-184801[U] |
| Mar. 4, 1985 | [JP] | Japan | 60-30689[U] |
| Mar. 4, 1985 | [JP] | Japan | 60-30686[U] |
| Mar. 4, 1985 | [JP] | Japan | 60-30690[U] |
| Jul. 30, 1985 | [JP] | Japan | 60-116972[U] |

[51] Int. Cl.$^4$ ............................................. B25B 23/06
[52] U.S. Cl. .................................................... 81/430
[58] Field of Search .................. 81/430, 57.37, 431, 81/433, 434, 435, 57.23

[56] References Cited

U.S. PATENT DOCUMENTS

| 3,958,614 | 5/1976 | Bandera | 81/430 |
| 3,986,540 | 10/1976 | Mori | 81/430 |
| 4,114,663 | 9/1978 | Viner | 81/430 |
| 4,333,367 | 6/1982 | Taffer | 81/430 |
| 4,363,573 | 12/1983 | Ginther | 81/430 |
| 4,442,738 | 4/1984 | Spencer | 81/57.37 |
| 4,478,112 | 10/1984 | Moulton | 81/57.37 |
| 4,495,841 | 1/1985 | Mori | 81/430 |

Primary Examiner—James G. Smith
Attorney, Agent, or Firm—Cushman, Darby & Cushman

[57] ABSTRACT

A hand held pneumatic screw aligner feeder device which may be used in any orientation incorporates a container for loose screws made up of two cup shaped walls forming a hopper, a groove between the walls used to align the screws, a separator to keep unaligned screws out of the groove, a chute to carry the screws to a pawl which allows only a single screw to be delivered to a transfer chamber and an inlet for compressed air along one of the hopper walls. The device may be coupled to a pneumatic screw tightener such that a screw in the transfer chamber is forced down a hose to the nose of the tightener so that the screw may be forced into an external surface. An actuating valve system within the aligner feeder tightener device, coupled to the tightener nose allows compressed air to flow to the aligner feeder when the tightener is not in use, and to the tightener only when the tightener is activated.

10 Claims, 7 Drawing Sheets

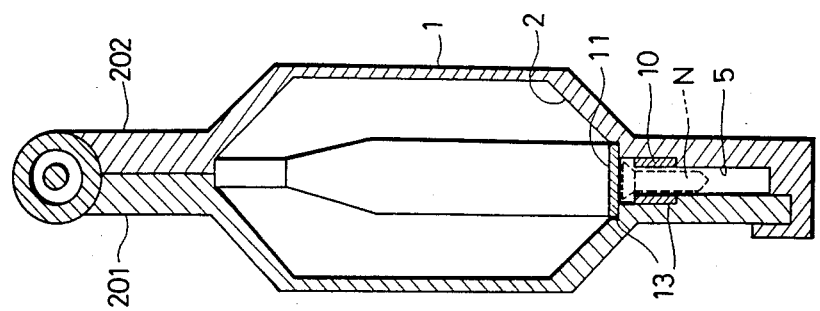
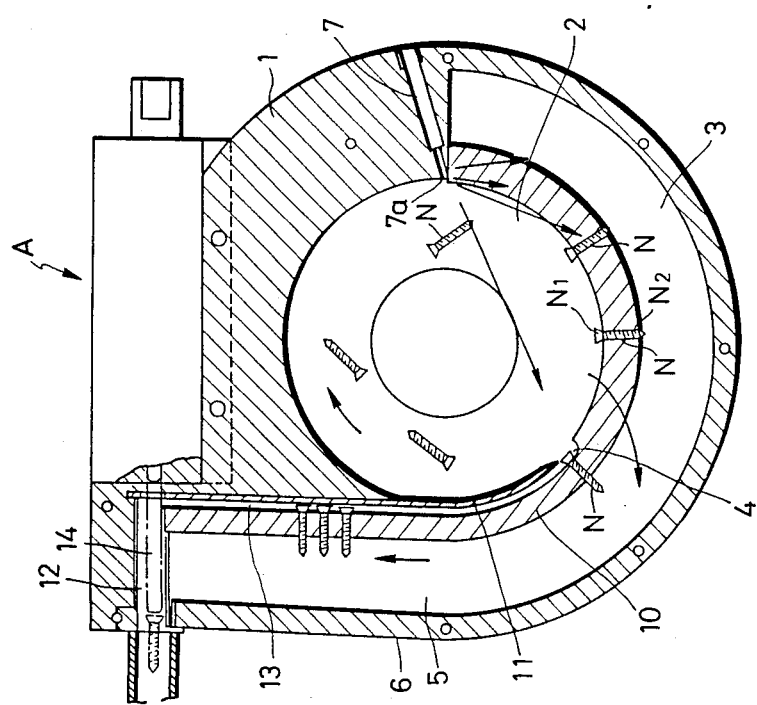

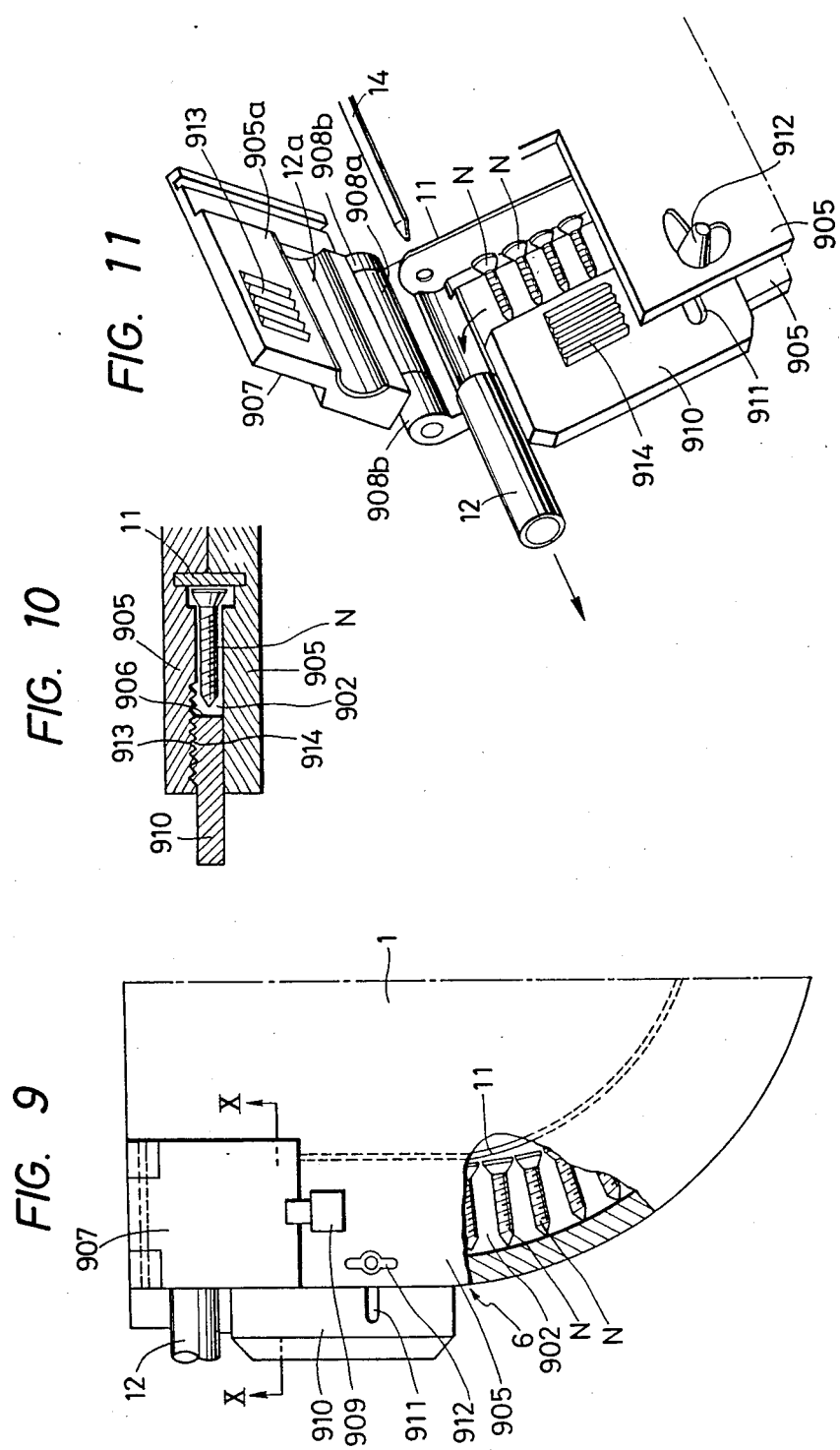

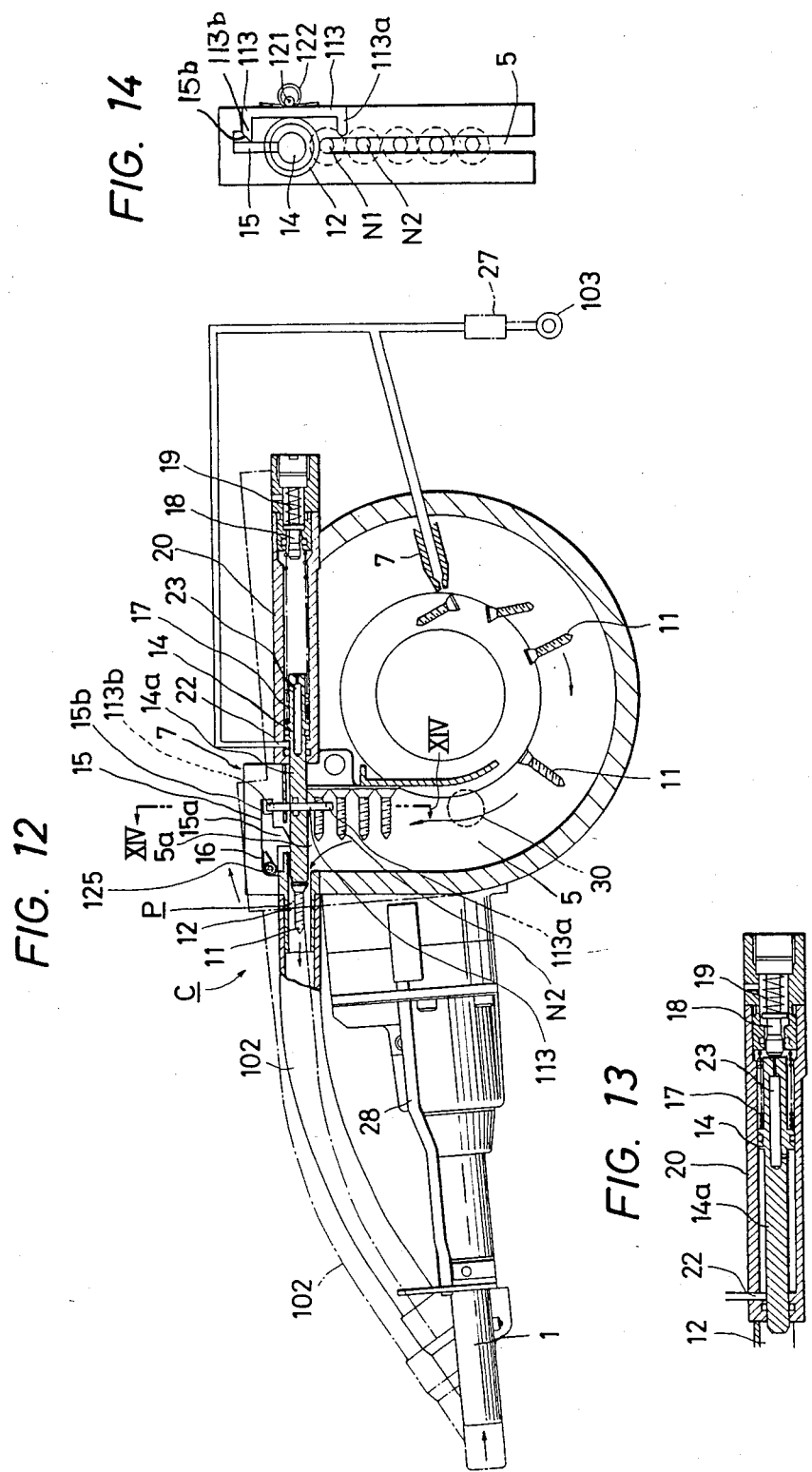

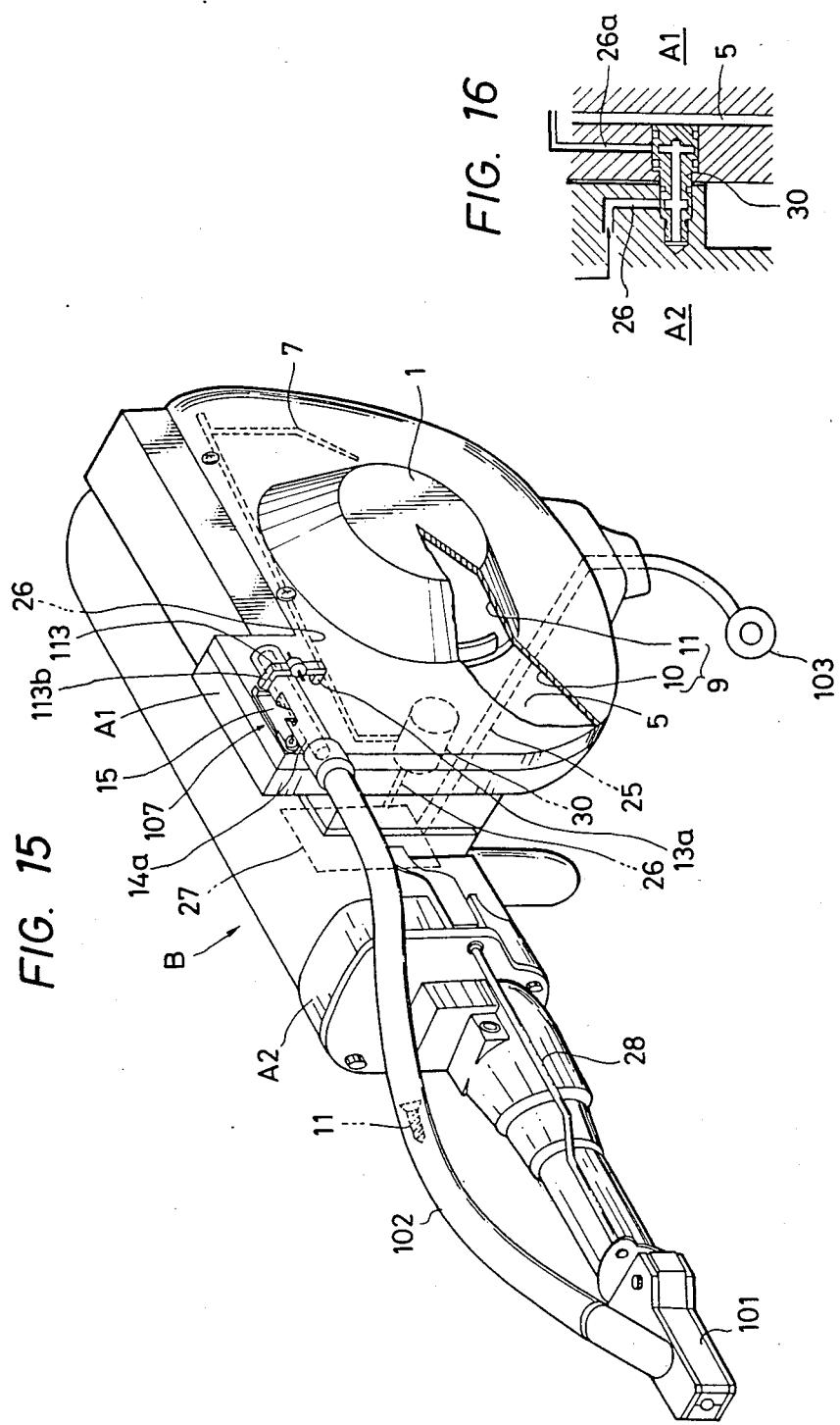

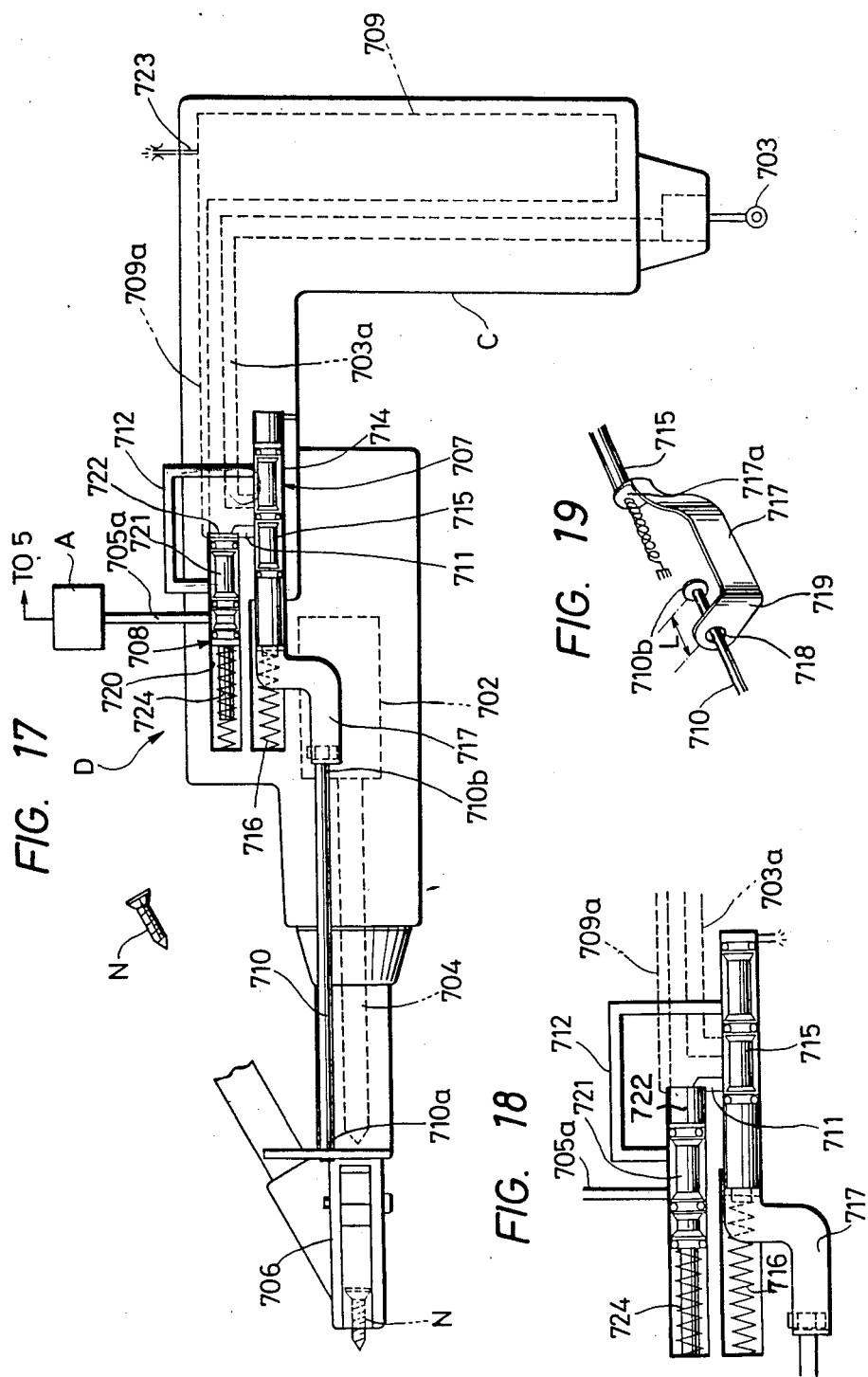

PNEUMATIC SCREW ALIGNER-FEEDER

BACKGROUND OF THE INVENTION

1. Field of the Invention

This invention relates to a pneumatic screw aligner-feeder incorporating a screw feeder and a screw tightener.

2. Description of the Prior Art

Heretofore, there have been employed screw aligner-feeders consisting of separate screw tighteners and screw feeders which were coupled with hoses for passing screws. U.S. Pat. No. 4,114,663 falls under this category. Such a screw tightener installed separately from a screw feeder is, however, limited to the operating radius of the connecting hose.

U.S. Pat. No. 2,922,447 describes another screw aligner-feeder incorporating a screw tightener and a screw feeder. In this invention, however, screws are fed by gravity. The device is therefore useful only when used in an upright position.

A similar problem arises with the use of an aligner-feeder developed by the present inventors which is the subject of Japanese Pat. No. 31716/76. This device uses compressed air to stir screws in a container and to force them along an incline guide wall on the bottom of the container, forcing the screw to an upper output in a desired orientation.

Since the inclined guide wall is installed on the bottom of the container, use of the device is not possible at an inverted position. Therefore, when this directional screw aligner is attached to a screw tightener using compressed air as a driving source, it is still not possible to use the combined device for driving screws into a ceiling.

U.S. Pat. No. 3,247,874 describes a mechanism for orienting random screws on a chute and supplying the screws one-by-one to a screw tightener on a first-in, first-out basis. This device uses a closing shutter to separate the first screw from the following one on chute and allows the first screw to fall into a chamber which leads to a screw tightener. Because this mechanism also utilizes gravity, reliability may be poor since clogging may occur depending on the orientation of the device in use. For the above reasons, conventional screw separator-feeders and screw tighteners are separately installed and hoses generally used to couple them.

SUMMARY OF THE INVENTION

The present invention is intended to solve the aforementioned problems and it is therefore an object of the invention to provide a non-directional screw aligner-feeder mechanism ensuring that all screws are aligned regardless of orientation of use.

It is a further object of the invention to provide a screw aligner-feeder which may be incorporated with a screw tightener.

It is yet another object of this invention to provide a screw aligner-feeder and screw tightener combination composed of materials which result in improved wearability.

It is further object of the invention to provide a screw aligner-feeder which is easily adjustable for use with screws of any length.

In order to accomplish the above-noted objects, there is provided a non-directional screw aligner comprising a container for containing a large number of screws, a pair of cone shaped guide walls formed opposite each other forming the container, an inlet for compressed air for stirring the screws along the peripheral direction of each guide wall of the container, a groove for receiving the shank portion of the screws and a screw alignment passage adjacent to the groove, the alignment passage being used to parallel the screws continuously received by the groove under the influence of compressed air supplied thereto.

A mechanism for isolating and feeding screws thus aligned carries the aligned screws via a chute to an outlet by means of compressed air. At the chute outlet, the mechanism further contains a stopper member equipped with a pawl which intervenes between the lead and second screws, an opening on the rearend side of a screw transfer chamber such that the screw may be driven out of the chute outlet and into the chamber, and a piston rod which delivers the screws supplied from the chamber to a screw passage. A stopper member limits the feed to a single screw. The invention further contains a system of air control valves which, when actuated, allow compressed air to enter the device thereby forcing a single screw out of the chamber and down a hose to a position such that the screw may be driven by the attached driver.

BRIEF DESCRIPTION OF THE DRAWINGS

Careful study of the following detailed description will allow for a better understanding of the instant invention in conjunction with the accompanying drawings, of which:

FIG. 1 is a vertical sectional view of the central portion of the screw aligner-feeder illustrating the preferred embodiment of the present invention;

FIG. 2 is a transverse sectional view of the central portion of the screw aligner-feeder of FIG. 1;

FIG. 9 is an elevation view of the principal portion of a magazine of the screw aligner-feeder;

FIG. 10 is a sectional view taken on line X—X of FIG. 9;

FIG. 11 is a perspective view of the principal portion of the magazine of FIG. 9;

FIG. 12 is a vertical sectional view of a screw tightener containing the screw aligner-feeder mechanism embodying the present invention;

FIG. 13 is a diagram illustrating a mechanism for driving a piston rod for delivering screws;

FIG. 14 is a sectional view taken on line XIV—XIV of FIG. 12;

FIG. 15 is a perspective view of the screw tightener containing the screw aligner-feeder according to the present invention;

FIG. 16 is a sectional view of the principal portion of the connection between the screw tightener proper and the screwed aligner-screw;

FIG. 17 is a vertical sectional view of the screw tightener for illustrating the operating mechanism of the screw aligner-feeder;

FIG. 18 is a diagram illustrating the operating conditions and set and timer valves; and FIG. 19 is a perspective view of the connection between a contact arm and a member for receiving the arm.

DETAILED DESCRIPTION OF THE PREFERRED EMBODIMENT

Figure 3:
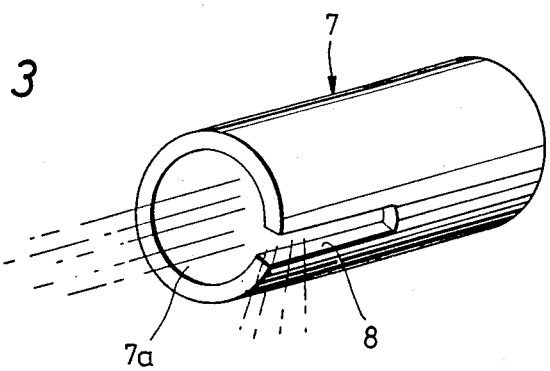

In FIGS. 1 and 2, a screw aligner is similar to that of a conventional screw aligner, wherein a pair of cone-shaped guide walls 2, face each other and form hopper 1. A guide groove 3, narrower than head N1 of screws N and wider than screw shanks N2 is formed in the periphery of guide walls 2. A magazine 6 having a screw alignment passage 5 communicating with guide groove 3 through a guidance section 4 is also shown. The screws contained in hopper 1 are stirred by means of compressed air forced into hopper 1 through blowing means 7. The screws are made to move along guide walls 2 so that they may fall into guide groove 3 in a certain alignment. The screws are forced from the guidance section 4 to screw alignment passage 5 under air pressure and aligned therein. The above described blowing means 7 is coupled to an outside air supply source (not shown).

Regardless of the position of the screws and the hopper, cone-shaped guide walls 2 in combination with the compressed air supply assure that the screws will be aligned in passage 5 regardless of the orientation of the hopper 1 when the device is in use. The ultimate screw alignment is shown in FIG. 2.

In the exemplary embodiment, the screw aligner body itself is formed from transparent engineering plastic. Internal members, however, such as head support edge 10, alignment passage 5 and separator 11 are preferably made of metal. Such a composition allows for improved wearability of the internal parts while still allowing an operator to visually check the number of screw remaining in the hopper. Durability and use are further improved since head support edge members 10 and separator member 11 are easily replaced. Because members 10 and 11 are fitted into groove 13, alignment of these parts upon replacement is assured.

Figure 4A:
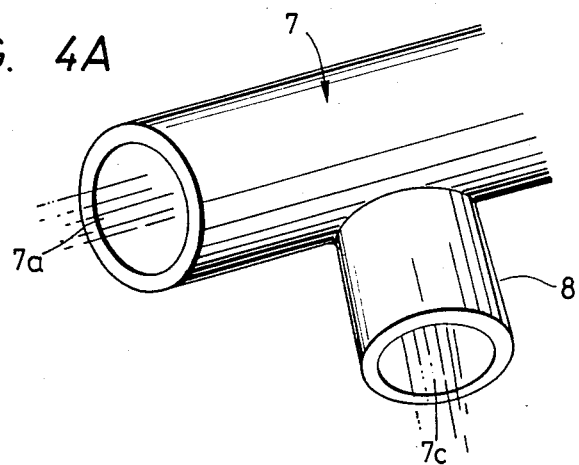
FIGS. 4a and 4b are enlarged perspective views of outlets for the air blown in the screw aligner-feeder.
Figure 4B:
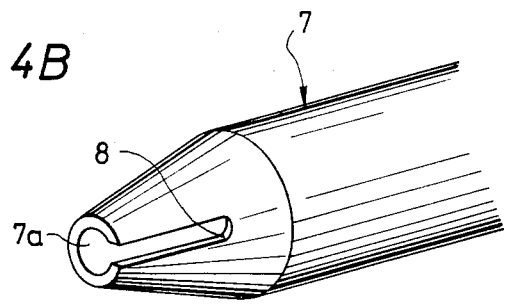

The outlet of blowing means 7 is directed to hopper 1 and the opening of magazine 6 and simultaneously to screw alignment passage 5 from the rearside of guide groove 3 as shown in FIGS. 1, 3 and 4. FIG. 3 indicates one possible means of splitting the compressed air stream. The compressed air exiting from portion 7a of FIGS. 3 and 4 is used to stir screws in hopper 1. Air exiting from slit or tube 8 in FIGS. 3 and 4 is used to move screws along screw alignment passage 5.

It is clear therefore, that air pressure applied in the direction of guide groove 3 will force the aligned screws to alignment passage 5 of magazine 6. This arrangement ensures that all screws are transferred to the magazine 6 smoothly and certainly such that a continuous stream of screws is available for use in chamber 12. Once in chamber 12, the screws are pushed forward by ejecting means 14 which is also operated by compressed air. It will be noted that in use, the above described screw feed mechanism results in improved feed efficiency and therefore improved ease of use.

Figure 5:
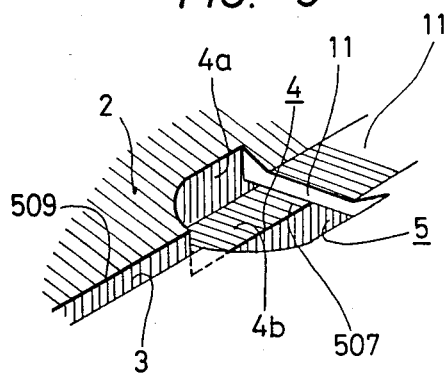
FIG. 5 is a perspective view of a screw guidance section of the screw aligner feeder.

FIG. 5 details screw guidance section 4. Screw guidance section 4 is composed of a screw guidance recess 4a and a screw head receiving face 4b formed at the bottom thereof. The screw guidance recess 4a is formed by cutting out the guide wall to the extent that at least the head of one screw end can be accommodated, whereas the screw head receiving face is made contiguous with an aligned screw head supporting face 507 in screw alignment passage 5. Front end 11a of the separator 11 is formed at roughly the same level as edge 509 between guide wall 2 and guide groove 3.

Figure 6:
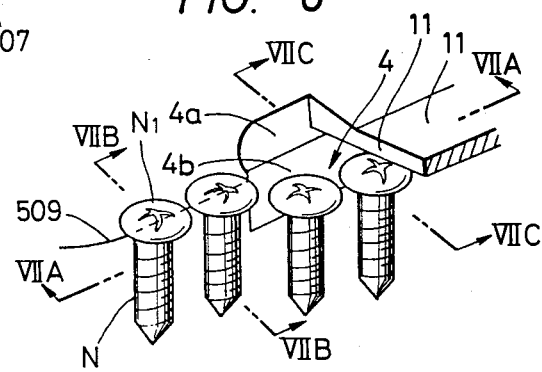
FIG. 6 is a perspective view illustrating the upper portion of the screw guidance section.
Figure 7A:
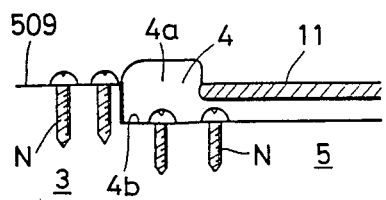
FIGS. 7a, 7b and 7c are sectional views taken on lines VIIa—VIIa, VIIb—VIIb and VIIc—VIIc of FIG. 6.
Figures 7B, 7C:
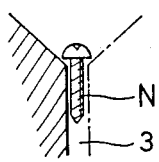

In this embodiment then, the screws contained in hopper 1 in bulk are stirred along guide walls 2 by compressed air blown out of blowing means 7 and allowed to fall into guide groove 3 with their heads aligned. Subsequently, the screws are guided to guidance recess 4a of guidance section 4 by the compressed air. As shown in FIGS. 6 and 7, the heads in one of the aligned screws supported by edge 509 between guide wall 2 and guide groove 3 are made to fall onto screw head receiving face 4b at the bottom of guidance recess 4a. Flat, pan and hexagonal head screws may all be used in the present invention with equal ease using the above construction. Since the screw head receiving face 4b is contiguous with screw supporting face 507 of screw alignment passage 5, the screw heads are prevented from being caught by separator 11 and are therefore smoothly delivered to screw alignment passage 5 by the compressed air.

Moreover, since the front end 11a of the separator 11 is arranged at roughly the same level as edge 509 between guide wall 2 and guide groove 3, it will constitute no obstacle to the stirring of the screws revolving within the hopper 1. Accordingly, the screws may be efficiently stirred without unduly wearing separator 11.

Figure 8:
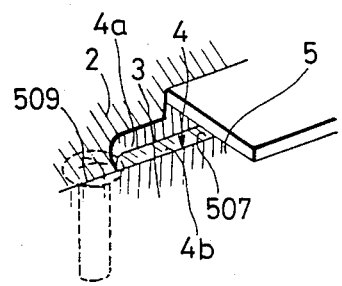
FIG. 8 is a perspective view of another screw guidance section of the screw aligner-feeder.

The configuration of guidance section 4 is not limited to the construction shown in FIGS. 5 and 6. As shown in FIG. 8, for instance, edge 509 between guide wall 2 and guide groove 3 may be formed at the same level as the screw heads supporting face 507 of screw alignment passage 5. The screw guidance recess 4a may be formed by cutting out guide wall 2 to the extent that at least the head of one screw can be accommodated, and the screw head receiving face 4b may be made contiguous to screw head supporting face 507.

In the above-described guidance section, the under surfaces of the heads of the screws are supported by the screw head receiving face formed at the bottom of the guidance recess. As the screw head receiving face is contiguous to the screw head supporting face of the screw alignment passage, the heads of the screws in the guide groove have already been placed at the same level as those supported on the screw alignment passage when the screws are introduced in the guidance section. The heads of the aligned screws supported by the edge between the guide wall and the guide groove are therefore smoothly guided to the screw supporting face of the screw alignment passage through the screw head supporting face in the screw guidance section without being caught by the separator. This also allows the use of different types of screws in the device.

FIGS. 9 through 11 show a mechanism for regulating magazine 6 for feeding screws arranged in the screw alignment passage up to cylindrical transfer chamber 12 of a screw tightener. Magazine 6 is equipped with a screw feed passage 902 for guiding and feeding the screws arranged within hopper 1 to cylindrical transfer chamber 12 arranged at the front end of screw feed passage 902. Compressed air is made to flow from hopper 1 to the transfer chamber 12 through screw feed passage 902 and the air flow is used to align the screws from hopper 1 in screw feed passage 902. Subsequently, the lead screw, having been separated from the following one, is fed from transfer chamber 12 to a tool such as a screw tightener (not shown).

Screw feed passage 902 is separated from hopper 1 by partition 11 and composed of a pair of side walls 905. Walls 905 face each other for supporting the screws in an aligned state. The aligned screws within the screw feed passage 902 are delivered to transfer chamber 12 by the compressed air flow.

Part 905a located adjacent to transfer chamber 12 (see FIG. 11), and part 12a of chamber 12 are each made part of divided side wall member 907 Member 907 is hingedly coupled to the screw feeder body by hinges 908a, 908b. A lock member 909 is attached to side wall 905 continuous to the side wall member 907. (See FIG. 9). When side wall member 907 is opened, lock member 909 is released, whereas lock member 909 is locked when side wall member 907 is shut. When side wall member 907 is opened, screw feed passage 902 and part of cylindrical chamber 12 are exposed.

As shown in FIG. 11, spacing member 910 is arranged in between side walls 905 and contains an adjustment hole 911 extending in the axial direction of the screws aligned in screw feed passage 902. Hole 911 is fixed by a fixing screw 912 driven into screw holes made in facing side walls 905 corresponding with the long hole 911.

Spacing member 910 may also be fixed by inserting a fixing screw into a screw hole in side walls 905 facing a recessed groove (not shown), in place of the long hole, made in one side of the bottom member, and fitting and pressing the lip of the fixing screw into and against the recessed groove.

Parallel opposed ridges 913 and 914 capable of engaging with each other, are formed on the opposed faces of side wall member 907 and spacing member 910. Ridges 913 and 914 run parallel to the direction of movement of screws in screw feed passage 102. Accordingly, opposed ridges 913 and 914 are engaged when side wall member 907 is in a closed position, ensuring that spacing member 910 is always kept parallel to screw feed passage 902.

The inside diameter of chamber 12 is made large enough to allow the passage of only one screw at a time. One side of the rear end of chamber 12 is opened to the front end of screw feed passage 902. The front end of chamber 12 is coupled to a tool such as a screw tightener, and a piston rod ejecting means 14 is positioned at the rear thereof. The rear end of chamber 12 is in two parts to allow access to the chamber when side wall member 907 is opened.

The ejecting means 14 is used to push the lead screw toward the front of the chamber so that the screw may be delivered by means of compressed air to the position where it is easily fed to a screw tightener. The ejecting means 14 normally comprising an air cylinder or piston rod.

In order to adjust spacing member 910 to the height of the screws to be used in a given application, side wall member 907 is opened to expose screw feed passage 902, the screws to be used are placed in screw feed passage 902, spacing member 910 is adjusted to the length of the screws, fixing screw 912 is tightened in place, side wall member 907 is closed to let parallel ridges 913 and 914 engage with each other, and finally the magazine is locked using lock member 909. The height of screw feed passage 902 is thus properly adjusted and the spacing member 910 is kept parallel to screw feed passage 902. Consequently, the compressed air flow is efficiently employed to feed the aligned screws while it is flowing through screw feed passage 902, and the screws are delivered to chamber 12, separated from each other, and subsequently fed to a tool such as a screw tightener.

Since the height of the screw feed passage 902 of magazine 6 is simply adjustable to the length of screws for use as aforementioned, the compressed air flow is allowed to pass through screw feed passage 902 efficiently to ensure that the screws for use are smoothly supplied.

In case screw feed passage 902 or chamber 12 is clogged with a screw for some reason while magazine 6 is operated, the screw can be taken out simply by opening side wall member 907 without disassemblying the apparatus. Although the engagement of the face of side wall member 907 with the opposing face of spacing member 910 is released, bottom member 910 is fixed to the side walls 905 with fixing screw 912 and the adjusted position is thereby maintained.

The direction in which side wall member 907 is opened is not limited to what has been described in reference to the above embodiment. Moreover, the means for keeping bottom member 910 parallel to screw feed passage 902 is not always limited to the use of ridges 913 and 914. There may be used, for instance, a rail on which spacing member 910 slides in parallel to screw feed passage 902 or other combinations of parts which engage each other when in the closed position.

FIGS. 12-14 show a screw tightener mechanism equipped with a separator-feeder mechanism for separating and feeding screws to the screw tightener via the magazine mechanism.

In FIG. 12, the screws separator-feeder mechanism is represented by a reference character C. The screw separator-feeder mechanism C comprises a stopper member 113 slidably installed at front end outlet 5a of chute 5 for aligning the screws by means of the above-described screw alignment mechanism, a piston rod 14 movably installed at the rear end of chamber 12 communicating with outlet 5a, and an actuating member 15 oscillatably provided in the position where piston rod 14 moves back and forth.

The front end of chute 5 is open and the rear end side of chamber 12 is made to communicate with the outlet 5a. The chamber 12 is designed to feed screws using air to a nose 1 installed in front of the screw tightener, nose 1 being slidable in the axial direction. The screws are aligned on chute 5 by compressed air and sent from front end outlet 5a to the rear end of chamber 12 and then fed to the nose of the screw tightener. However, because the alignment direction is roughly perpendicular to the feed direction, the compressed air perpendicularly hits the shank of the screws sent to the rear end of chamber 12 and consequently the screws are pressed against only the inside wall of chamber 12 but not made to move forward. In order to make the screws move forward using compressed air, they must be delivered to the position P of the chamber 12. Piston rod 14 is installed as means for thus delivering the screws to position P.

Piston rod 14a of FIG. 13 is projected from the tip of piston 14 slidably contained in a cylinder 20 and movable from the rear end of and into chamber 12. When the piston rod 14 moves back, it moves back behind the heads of the aligned screws in chute 5 after opening chamber 12 so that the screws may be supplied from outlet 5a into chamber 12.

The piston driving mechanism is so arranged as to move back and forth while the driving air is supplied to the screw alignment mechanism. In other words, actuating member 15 swings in a direction opposite to the movement of piston rod 14a abutting against the engaged boss 15a of actuating member 15. Simultaneously, stopper member 113 swings interlockingly in the direction opposite thereto to make pawl 113a retreat from holding the second and following screws in position. The screws in chute 5 are thus freed, whereas only one screw is sent to the front end of chute 5. That procedure is repeated so that the lead screw of those aligned on chute 5 may successively be delivered to feed position P. The compressed air supplied from air supply hole 7 causes each screw to reach the fixed position where it is fed into the screw tightener.

FIGS. 12 and 13 further describe the mechanism for driving the piston rod 14a via compressed air supplied to drive the screw alignment mechanism. The compressed air supplied from driving air supply port 22 into cylinder 20 works on the front side of piston 14, the side having a small effective pressure receiving area, and causes piston 14 to retreat from the front side against the force of a spring 17 toward an exhaust valve located opposite thereto (piston rod 14a moves back). Piston 14 engages with and presses exhaust valve 18 at the end of its back movement. Exhaust valve 18 moves against the force of a spring 19 to the position where it intercepts the air from cylinder 20 and makes airtight one side of cylinder 20, that side being opposite to exhaust valve 18 (FIG. 13). However, the compressed air supplied from driving air supply port 22 is supplied from the front side toward exhaust valve 18 through a communicating pipe 23 and the pressure within cylinder 20 on exhaust valve 18 side is increased. As the pressure inside exhaust valve 18 increases, the pressure working on piston 14 surpasses the pressure on the supply side because the effective pressure receiving area of the piston on its exhaust valve 18 side is set greater than that on its front side and because spring 17 force works on its front side. Consequently, piston 14 is caused to move forward to the front side when piston rod 14a moves forward and enters chamber 12, causing the screw to move to position P. The inside pressure above allows exhaust valve 18 to remain in the intercepting position. When piston 14 returns to its initial position, the supply of compressed air is stopped and it is discharged, whereby the pressure within cylinder 20 is reduced. Consequently, exhaust valve 18 is energized by spring 19 and returned to the position where cylinder 20 is allowed to communicate with the air, so that the initial air pressure is restored as the air in cylinder 20 is discharged therefrom.

FIG. 14 shows that stopper member 113 is equipped with pawl 113a at one end and abutting piece 113b at the other, and oscillatably installed at front end outlet 5a. An oscillating shaft 121 is provided with a spring 122, which energizes pawl 113a of stopper member 113 and abutting piece 113b so that the former and the latter may rise and fall, respectively. Pawl 113a is arranged to penetrate in between the lead screw and a second screw and retreat therefrom when it oscillates.

As seen in FIG. 12, actuating member 15 is plate-like, one end of which is pivotally coupled to oscillating shaft 125 fixed to the position where piston rod 14a moves back and forth, whereas inclined face 15b is formed at the other end, the intermediate portion being provided with an engaging projection 15a. Inclined face 15b is made to abut against and engage with the abutting piece 113b of the stopper member 113 and the rear end of projection 15a is cut obliquely. Moreover, oscillating shaft 125 is equipped with spring 16 by which inclined face 15b and engaging projection 15a are respectively energized toward chamber 12 and stopper member 113. When piston rod 14 is in the rear position, actuating member 15 is energized by spring 16 and its engaging projection 15a is deeply inserted into chamber 12. At the same time, inclined face 15b is moved toward stopper member 113. Abutting piece 113b then slides upward along inclined face 15b and is pushed up against the force of spring 122 whereby stopper member 113 oscillates around the oscillating shaft 121, allowing pawl 113a to enter the front positron of the second screw in chute 5. In the reverse action, projection 15a is pushed back by, and made to engage with the piston rod, while inclined face 15b retreats from stopper member 113. At this time, the abutting piece 113b is slid downward along inclined face 15b by the force of spring 122 and stopper member 113 is oscillated around oscillating shaft 121, forcing pawl 113a to retreat. The oscillations of actuating member 15 and stopper member 113 are thus interlocked.

When piston rod 14a is moved back using the compressed air from air source 103 while the compressed air for driving the screw alignment mechanism A is supplied from the air source, actuating member 15 correspondingly oscillates and pawl 113a of stopper member 113 moves forward to the front of the second screw according to the oscillation of actuating member 15. As the lead screw is free when the second and the following screws in chute 5 are checked by pawl 113a, the lead screw is separated from the following ones. When piston rod 14a retreats from screw chamber 12 and the lead screw is pushed into chamber 12 by compressed air. Subsequently, when piston rod 14 moves forward, the screw in chamber 12 is delivered to feed position P by piston rod 14 and fed by compressed air to a fixed screw driving position at the nose of the screw tightener. When piston rod 14a moves forward it abuts actuating member 15, causing actuating member 15 to oscillate in the direction opposite to the movement of piston rod 14, and retreats from the above position. A single screw among those in chute 5 is simultaneously sent to the front end of the chute by the compressed air. When piston rod 14 is then moved back, actuating member 15 oscillates as aforementioned and pawl 113a correspondingly moves forward to the front of the second screw to check the delivery of the second and following screws, whereas the lead screw is separated from the second and supplied into the opened screw passage. This procedure is repeated to deliver and feed each lead screw successively to the feed position and then to the screw tightener using the compressed air.

FIG. 15 depicts the screw aligner-feeder and tightener as a whole, including screw tightener B. Screw tightener B contains an air motor (not shown) with a driver bit held therein. Screw tightener body A2 is equipped with a nose 101 forwardly projected from the driver bit which is made to slide in the axial direction, and air control device 27. During the initial period of the actuating stroke of nose 101, air control device 27 allows communication between air passages 25 and 26. Air is supplied from air source 103. During the late period of the actuating stroke, as the driver is pulled away from a wall for example, air control device 27 cuts off communication of both air passage 25 and 26. Air control device 27 may be constructed of a contact arm 28 coupled to nose 101, and a valve for intermittently cutting off communication of air passages 25 and 26, depending on the movement of contact arm 28.

The screw tightener body A1 is rotatably coupled to screw aligner-feeder body A2 with oscillating shaft 30. Accordingly, screw feeder A1 is oscillatably coupled to screw tightener body A2 with oscillating shaft 30 as a pivot. (FIG. 16). Oscillating shaft 30 is formed of a hollow body with one end connected to air source 103 through air control device 27 of the screw tightener body A2 and air passage 25. The other end is connected to screw aligner-feeder A through air passage 26a. Therefore, no air passages need to be installed externally.

Moreover, nose 101 and screw separator-feeder mechanism 107 of the screw feeder A1 are coupled together through hose 102. The screws supplied from screw aligner-feeder A are supplied through hose 102 to nose 101.

As screw aligner-feeder A is equipped with the screw aligner and screw separator-feeder mechanisms, the screws contained at random in hopper 1 can be aligned and successively supplied through hose 102 to nose 101 using compressed air. Nose 101 is pressed against the surface to which the screw is to be applied and made to slide in an axial direction along screw tightener body A2. Hose 102 is pressed in the same direction at that time. As hose 102 has intrinsic strength, the screw aligner-feeder is forced back around shaft 30 by hose 102 as shown in FIG. 12. This aspect of the invention keeps hose 102 from kinking, thereby avoiding blockage of the hose.

Although FIG. 12 illustrates screw aligner-feeder A oscillating while piston rod 14 is in the forward position, the oscillation of the screw aligner-feeder and the screw pushing operation are normally separately conducted and the illustration in the figure is not definitive.

FIGS. 17–19 depict a compressed air control means for controlling the compressed air from an air source to the above-described apparatus. In the screw tightener employing compressed air as a power source according to the present invention, the screw tightener body and the screw feeder are driven by a common air source. Consequently, there is an inherent disadvantage that, if both units are simultaneously driven, the air pressure for driving the screw tightener may be reduced and thus fail to tighten screws completely.

In order to solve this problem, the nose member is forwardly projected from screw tightener body over the drive bit and slidably installed along the axial line defined by the bit. The screw tightener body is equipped with an air chamber having a small exhaust hole; a set valve for letting an inlet port connected to the air source communicate with a first coupling port; and a first coupling port connected to the actuating chamber of a timer valve or a second coupling port provided in the timer valve. In this construction, the set valve itself is operatively coupled to the nose member, and the timer valve containing an actuating chamber at one end is used for making the first coupling port communicate with the air chamber and intermittently cut off an outlet port connected to the second coupling port and the screw feeder. The set valve is operated so as to make the inlet port communicate with the first coupling port based on the movement of the nose member as it is initially pushed against a surface. The timer valve then communicates with the second coupling port and the outlet port when the pressurized air is supplied to the actuating chamber. The air source communicates with the second coupling port based on the movement of the nose member in the last period of the actuating stroke of the nose member, and the timer valve self-holds until the pressure in the air chamber is reduced to a fixed level. Thus, the valves allows transfer of the full force of the compressed air to the driver as needed, and to the aligner-feeder otherwise, as shown in FIG. 17.

FIG. 17 shows a screw tightener D containing air motor 702 in screw tightener body C. The compressed air supplied from an air source is used to drive the air motor 702 and rotate driver bit 704 connected to the output shaft thereof, so that the screw attached to the front end of the driver bit 704 is driven into a material (not shown). Air motor 702 is supplied with air in a manner analogous to the embodiment illustrated in FIG. 2 and the embodiment of FIG. 15, though this connection is not shown in detail in FIG. 17, for clarity. Screw tightener D is also equipped with a mechanism for actuating a screw feeder A for supplying screws to the front end of driver bit 704.

The mechanism for actuating screw feeder A comprises nose member 706 provided at the front end of screw tightener body C, set valve 707, timer valve 708 and air chamber 709. Set valve 707 is operationally coupled to nose member 706 through contact arm 710. Set valve 707 and timer valve 708 are operated in accordance with the movement of nose member 706 accompanied by the operation of screw tightener C. Air source 703 is connected to air chamber 709 when screw tightener C is operated to drive screws and to the screw feeder while screw tightener C is not operated.

Nose member 706 is cylindrical and provided with a screw passage branching off the cylinder. Nose member 706 is forwardly projected from driver bit 704 installed in screw tightener body C and slidably provided along the axial line and always forwardly energized by a spring (not shown). One end 710a of contact arm 710 is coupled to nose member 706 is the direction wherein it sides.

Set valve 707 and timer valve 708 are installed close to screw tightener body C and respectively communicate with first and second coupling ports 711 and 712.

Set valve 707 accommodates slidable valve stem 715 with valve housing 714 equipped with the first and second coupling ports 711 and 712 communicating with timer valve 708, and inlet port 703a communicating with the air source 703 so as to energize one end of valve stem 715 by means of spring 716. Inlet port 703a and second coupling port 712 are connected in the position (shown in FIG. 17) to which valve stem 715 has moved against the force of spring 716, whereas inlet port 703a and first coupling port 711 are connected when valve stem 715 has moved to the position (shown in FIG. 18) energized by spring 716. In FIG. 19 it is seen that one end 717a of receiving member 717 is fixed to the end of spring 716 of valve stem 715. Bent piece 719 having through hole 718 is formed at the other end of receiving member 717 and the free end of contact arm 710 is fitted into through hole 718 in such a manner that the contact arm is permanently held by receiving member 717. The stroke of valve stem 715 is set smaller than the actuating stroke of nose member 706 and the difference therebetween is defined as a play L between bent piece 719 of receiving member 717 and the end of contact arm 710 in the shifted position of nose member 706 when it is moved toward screw tightener body C. If nose member 706 is returned to the original position again, the end of contact arm 710 will catch bent piece 719 in the meantime to cause receiving member 717 to move. Accordingly, valve stem 715 will move to the associated position in the initial or last position of the actuating stroke.

The valve arrangement further contains timer valve 708, slidable valve stem 721 within valve housing 720, spring 724, and actuating chamber member 722. In use, the movement of the valves ensures that actuating chamber 722 always communicates with first coupling port 711 and with air passage 709a connected to air chamber 709. A second coupling port 712 is connected to set valve 707 and outlet port 705a which is connected to the screw feeder. When valve stem 721 moves to the position energized by spring 724 (as shown in FIG. 17), outlet port 705a is disconnected from second coupling port 712 and screw feeder 705 is cut off and ports 712 and 705a are not allowed to communicate with each other.

Air chamber 709 is installed in the rear of screw tightener body 701 and equipped with a small exhaust hole 723. Even if the pressurized air is supplied to air chamber 709, the air will be discharged from small exhaust hole 723 and the pressure inside air chamber 709 will gradually reduce as time elapses.

As screw tightener C operates to drive a screw, driver bit 704 and a screw attached to the tip of driver bit 704 is pressed against a material into which it is driven. Nose member 706 is then slid along the axial line of driver bit 704. Contact arm 710 subsequently moves to release the engagement of end 710b of contact arm 710 and valve stem 715 is moved by the force of spring 716 to the position where inlet port 703a is allowed to communicate with first coupling port 711. Consequently, pressurized air from air source 703 is supplied from the first coupling port 711 to air chamber 709 through the actuating chamber 722 of timer valve 708. As the pressure inside air chamber 709 increases, the pressure in actuating chamber 722 is increased and accordingly valve stem 721 moves against the force of spring 724 to the position where second coupling port 712 is allowed to communicate with outlet port 705a connected to screw feeder 705 (see FIG. 18). At this time, second coupling port 712 is kept cut off inlet port 703a and air source 703. Accordingly, the pressurized air is supplied to air chamber 709 while screw tightener C is operating but not supplied to screw feeder 705.

When operation of the driver bit is stopped, however, nose member 706 is slid in the opposite direction along the axial line of driver bit 704. Contact arm 710 then moves in the opposite direction to the aforementioned, allowing the end of contact arm 710 to engage with receiving member 717 at the end of the return process. Consequently, set valve 707 is returned to its original position where inlet port 703a communicates with second coupling port 712, and at the same time inlet port 703a is cut off from first coupling port 711. However, timer valve 708 is held in place in the above-described position because of the pressurized air acting in air chamber 709. For this reason, inlet port 703a is made to communicate with outlet port 705a of the screw feeder through second coupling port 712, so that pressurized air is being supplied to the screw feeder 705. As there is provided small exhaust hole 723 in air chamber 709, the pressure in the air chamber gradually decreases to a fixed level after predetermined time elapses and the force of spring 724 surpasses the pressure to release the self-holding timer valve 708. Accordingly, the valve stem 721 moves to a position where outlet port 705a is cut off from second coupling port 712. This action ensure screws will be fed to the driver before the next screws is to be aligned.

As the mechanism of screw feeder 705 is designed to cut inlet port 703a off outlet port 705a in response to the actuating stroke of the nose member, it is impossible to supply the pressurized air to screw feeder 705 while screws are tightened and tighten screws while the screw feeder 705 is driven. Moreover, because set valve 707 operates in the initial and last periods of the actuating stroke of nose member 706, the supply of the air to air chamber 709 allows thus action.

In the screw aligner-feeder according to the present invention, one and the same air system can be used as a power source for aligning, feeding and tightening screws. Since a screw aligner and a screw tightener can be used in one body, the radius of operation is not limited. Moreover, the screw alignment and distribution mechanisms operated by compressed air allow nondirectional operation, i.e., operation of the device is the same whether driving screws into a floor or a ceiling.

Although only a few embodiments have been described in detail above, those skilled in the art will readily appreciate that many modifications are possible in the preferred embodiments without materially departing from the novel teachings and advantages of this invention. Accordingly, all such modifications are intended to be included within the scope of this invention as defined by the following claims.

What is claimed is:

1. A screw aligner-feeder mechanism comprising:
   means for containing screws;
   means defined within said containing means for aligning screws in said containing means;
   means defined within said containing means so as to be spaced from said aligning means for separating screws not aligned by said aligning means from screws aligned by said aligning means;
   means operatively coupled to said aligning means for feeding aligned screws from said containing means; and
   pneumatic means operatively coupled to said containing means for conveying air under pressure to said containing means so as to: (1) stir screws in said containing means, (2) direct screws toward said aligning means, (3) align screws in said aligning means and (4) direct screws along said feeding means.

2. A screw aligner-feeder mechanism comprising:
   a screw container having a pair of cone shaped trapezoid walls defining an alignment groove along the outer periphery of said container and used to align and contain screw shanks;
   a chute connected to said alignment groove in the tangential direction and used to lead aligned screws out of said container;
   a separator member arranged on the boundary between said chute and said alignment groove and used to distinguish between aligned and nonaligned screws and to introduce the aligned screws into said chute; and
   nozzle means for jetting out compressed air in a fixed direction for rotating and stirring the screws contained in said container and directing the screws therein.

3. A screw aligner-feeder as claimed in claim 2, wherein said walls are primarily plastic with metallic edges defining said alignment groove, said separator member also being metal to implement reduction in weight and improve durability.

4. A screw aligner-feeder as claimed in claim 2, wherein said nozzle means also sends the aligned screws in said alignment groove toward said chute.

5. A screw aligner-feeder as claimed in claim 2, wherein said chute includes an enclosed passage whose bottom is adjustable to the length of screws so that the screws on said chute may effectively be led out of said screw aligner-feeder.

6. A screw aligner-feeder mechanism comprising:
  means for containing screws;
  inlet means defined in said containing means and operatively coupled to a source of compressed air for allowing entry of compressed air from said source so as to move screws within said containing means;
  said containing means defining a alignment groove for aligning screws moved by said compressed air in said containing means;
  chute means connected to said alignment groove for feeding screws aligned in said groove from said containing means;
  separator means defined within said containing means so as to be positioned along said groove and spaced therefrom for preventing screws not aligned in said groove from entering said chute means;
  means positioned at an outlet of said chute means for selecting a single aligned screw from said chute means; and
  means for advancing said single screw to a driving position in response to the application of compressed air.

7. A screw tightener equipped with screw feeder, said screw tightener comprising:
  a body;
  a nose member including means for holding screws at an end of said nose member, said nose member being slidable with respect to said body;
  a driver bit disposed in said nose member;
  means for rotating said driver bit;
  a screw aligner-feeder rotatably supported on said body and having a chute which guides aligned screws;
  screw separator-feeder means for separating the lead screw from the screws aligned in said chute of said screw aligner-feeder; and
  a flexible conduit connecting said separator-feeder means with an opening in said nose member for feeding screws, said nose member being pushed in to expose said lead screw for driving causing said flexible conduit to rotate said aligner-feeder.

8. A screw tightener as claimed in claim 7, wherein said screw separator-feeder means comprises:
  means defining a transfer chamber;
  means for holding the lead screw supplied from said chute of said screw aligner-feeder in said transfer chamber;
  piston rod means for advancing the screw arranged and held in said transfer chamber; and
  compressed air driver means for sending the screw advanced by said piston rod toward said nose member through said flexible conduit connected to said transfer chamber.

9. A screw tightener as claimed in claim 8, further comprising means for driving said screw aligner-feeder and said screw separator-feeder means for a fixed period of time upon completion of a screw tightening operation so that sufficient compressed air can be supplied for rotating said driver bit during the screw tightening operation.

10. A screw aligner-feeder-tightener mechanism comprising:
  first and second cup-shaped opposing walls for containing loose screws;
  said walls defining an alignment groove formed at the periphery of said walls having a width to allow the shanks of said screws to fit therein;
  a chute connected to said alignment groove for delivery of said screws from said groove;
  separator means defined within said walls so as to be positioned along said groove and spaced therefrom for preventing screws not aligned in said alignment groove from entering said chute;
  an inlet port defined through the surface of at least one of said walls and operatively coupled to a source of compressed air to allow entry compressed air from said source so as to move screws contained between said walls;
  means positioned at an outlet of said chute for selecting a single screw form said chute;
  a movable piston rod means for advancing said single screw toward a driving position in response to the application of compressed air;
  tightener means for forcing said advanced screw into a desired external surface, said tightener means being driven by compressed air; and
  actuating means for selectively providing compressed air to said inlet port and said drive means for a fixed period of time when said tightener means finishes forcing said advanced screws.

* * * * *